*J. Newman,*
*Bending Wood.*

Nº 56,788. Patented July 31, 1866.

Witnesses:
William Cliffno
Henry E. Houston.

Inventor:
Joseph Newman.

UNITED STATES PATENT OFFICE.

JOSEPH NEWMAN, OF FALMOUTH, MAINE.

IMPROVEMENT IN WOOD-BENDING MACHINES.

Specification forming part of Letters Patent No. 56,788, dated July 31, 1866.

*To all whom it may concern:*

Be it known that I, JOSEPH NEWMAN, of Falmouth, in the county of Cumberland and State of Maine, have invented a new and Improved Wood-Bending Machine; and I hereby declare the following to be a full, clear, and exact description thereof, which will enable others skilled in the art to make and use my invention, reference being had to the accompanying drawings, forming part of this specification, in which—

Figure 3:
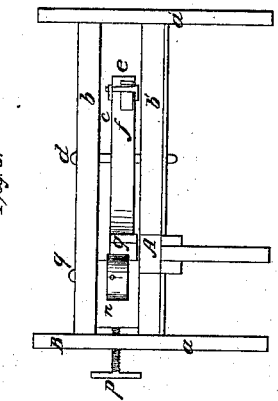
Figure 1:
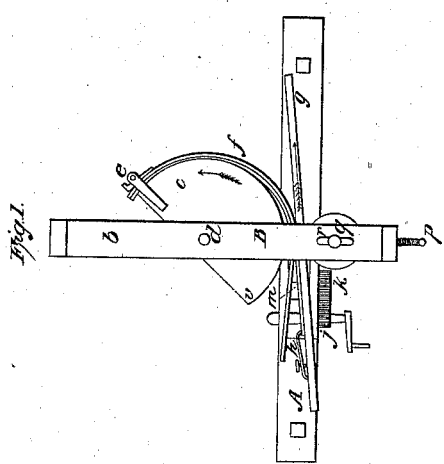
Figure 2:
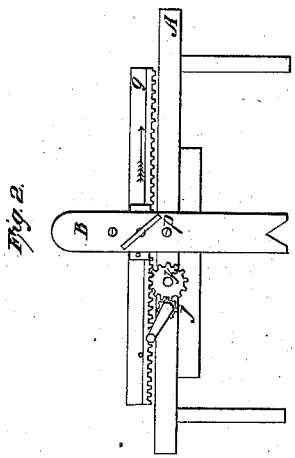

Figure 1 shows a top plan of my machine. Fig. 2 is a side elevation, showing the gearing and toothed rack; Fig. 3, an end elevation, showing the means of regulating the pressure upon the mold.

My invention has for its object the production of a machine for bending wood in which the liability of the wood to break is lessened, and in which the wood is submitted to an equal compression throughout its whole extent.

A B show two frames placed at right angles to each other, the said frames being horizontal and having the operating parts of my invention placed therein and attached thereto.

B is composed of the two upright portions $a$ $a'$ and the longitudinal cross-beams $b$ $b'$. Between $b$ $b'$ is placed the mold $c$, turning on the pivot $d$. $e$ shows a clamp and wedge on the mold, to confine one end of the wood to be bent; $f$, a metallic band passing around the mold $c$ on the outer side of the wood to be bent, to relieve the wood from a liability to fracture.

$g$ is a toothed rack resting and sliding on the part A of the frame. $h$ shows a dog or clamp regulated by a screw and employed to confine the end of the metallic band $f$, the other end of the band $f$ being confined in the clamp $e$. A second use of the metallic band $f$, thus confined, is to impart motion to the mold $c$, as the toothed rack $g$ is moved by the means hereinafter described. $i$ shows a piece of wood placed between the metallic band $f$ and the periphery of the mold $c$, and which is in the process of being bent. $j$ shows a geared wheel turned by a crank and moving the larger geared wheel $k$. The shaft upon which the wheel $j$ is set is inserted in the part A of the frame, as illustrated in the drawings.

$m$ is a small geared wheel on the same shaft with the wheel $k$, which shaft also passes through the part A of the frame. The wheel $m$ is placed in a slot or bed constructed in the part A of the frame, as indicated in the drawings. The gearing on the wheel $m$ works into teeth on the rack $g$, and moves the rack in the desired direction.

$n$ indicates a pressure-block set between the parts $b$ $b'$ of the frame and having the truck $o$. The block is moved toward or from the mold $c$ by the jack-screw $p$. The truck $o$ turns on the bolt $q$, which moves in the slot $r$, and serves also to retain the block $n$ in position.

The operation of the above-described machine is as follows: Turn the mold $c$ in such way that the clamp $e$ will touch the rack $g$. The wood to be bent is then placed between the metallic band $f$ and the mold, and secured by driving in the wedge in the clamp $e$. Bring the block $n$ against the mold by means of the jack-screw $p$. Turn the wheel $j$ by means of the crank, and the rack is pushed along the frame A by the wheels $k$ and $m$ and the teeth on the rack. The motion of the toothed rack is imparted to the mold $c$ by the metallic band $f$, confined as before described, and the wood, thus encompassed by the band and pressed by the block $n$, is formed to the size and shape of the periphery of the mold $c$. Hooks may then be placed over the ends of the wood to retain it in the form thus imparted and the wood removed from the mold. When the mold $c$ is to be turned back in the position to receive a piece of timber the wheel $j$ can be removed from the frame A by slipping its shaft out of the frame, thus throwing the wheel $k$ out of gearing and allowing the mold and rack to be easily turned back.

The patents granted to Frederic Seidle and Samuel Eberly, July 10, 1860, David B. Hedden, October 16, 1860, and C. L. Nelson and Oscar Bostwick, March 27, 1860, are different from my invention.

That of Seidle and Eberly comprehends the combination of a revolving yielding-pressure pattern with an unyielding sliding bed, and also attaching the pattern to the frame in such manner that it can be removed by drawing it out without removing any bolts.

My invention does not embrace, and I do not claim, the combination of a yielding-pressure pattern with an unyielding sliding bed; neither do I claim any method of attaching the pattern or mold to the frame; neither do I claim applying the end pressure to the lumber by means of an adjustable weight, as set forth in the patent of Hedden, above named.

The patent issued to Nelson and Bostwick embraces two screws working in connection with the boxes of a shaft, by means of which the distance between two pressure-wheels can be increased or lessened, in order to suit different thicknesses of timber, also an adjustable guide and an adjustable roller to press upon the timber as it is fed.

I do not claim two pressure-wheels to suit different thicknesses of timber, neither do I claim an adjustable guide and roller to press upon the timber throughout its length as it is fed.

In my invention the wood is first bent by compression between the mold $c$ and the metallic band $f$, said band $f$ being pressed upon the wood by the truck $o$ in the block $n$, and being confined at both ends, as before described. The band $f$ thus performs the triple office of giving motion to the mold $c$, bending the wood, and assisting it to sustain the strain of being bent. The degree of compression upon the mold and timber is regulated by the screw $p$, block $n$, and truck $o$.

What I claim as my invention, and desire to secure by Letters Patent, is—

Operating the mold $c$, or form for bending, by means of the metallic bending-strap $f$, which is attached to the mold at one end and to the reciprocating rack $g$ at the other, all constructed to operate substantially as described.

JOSEPH NEWMAN.

Witnesses:
WILLIAM P. NEWMAN,
JOHN C. SOULE.